United States Patent [19]
Gauchel et al.

[11] Patent Number: 5,914,080
[45] Date of Patent: Jun. 22, 1999

[54] METHOD AND APPARATUS FOR THE IN-LINE PRODUCTION AND CONVERSION OF COMPOSITE STRAND MATERIAL INTO A COMPOSITE PRODUCT

[75] Inventors: James V. Gauchel, Newark; Margaret Woodside, Pickerington; Frank J. Macdonald; Hellmut I. Glaser, both of Granville, all of Ohio

[73] Assignee: Owens-Corning Fiberglas Technology, Inc., Summit, Ill.

[21] Appl. No.: 08/695,607

[22] Filed: Aug. 12, 1996

Related U.S. Application Data

[63] Continuation-in-part of application No. 08/540,430, Oct. 10, 1995, abandoned.

[51] Int. Cl.$^6$ .................................................. C03B 37/028
[52] U.S. Cl. .............................. 264/103; 65/450; 65/452; 65/453; 65/480; 65/500; 65/529; 65/535; 65/536; 264/148; 264/151; 264/171.13; 264/257; 425/104; 425/106; 425/145; 425/297; 425/305.1; 425/377
[58] Field of Search .................................... 264/103, 148, 264/151, 171.13, 211.11, 257; 425/104, 106, 145, 297, 305.1, 377; 65/442, 447, 450, 452, 453, 480, 500, 529, 535, 536

[56] References Cited

U.S. PATENT DOCUMENTS

| | | |
|---|---|---|
| 3,042,570 | 7/1962 | Bradt . |
| 3,050,427 | 8/1962 | Slayter et al. . |
| 3,887,347 | 6/1975 | Reese . |
| 4,013,435 | 3/1977 | Kane et al. . |
| 4,368,232 | 1/1983 | Morioka et al. . |
| 4,516,996 | 5/1985 | Willard et al. . |
| 4,537,610 | 8/1985 | Armstrong et al. . |
| 4,776,162 | 10/1988 | Glaser et al. . |
| 4,790,136 | 12/1988 | Glaser et al. . |
| 4,802,331 | 2/1989 | Klink et al. . |
| 4,840,755 | 6/1989 | Nakazawa et al. . |
| 4,853,021 | 8/1989 | Soszka et al. . |
| 4,898,770 | 2/1990 | Dunbar . |
| 4,927,445 | 5/1990 | Soszka et al. . |
| 4,948,408 | 8/1990 | Huey . |
| 5,007,947 | 4/1991 | Kenmoti et al. . |
| 5,011,523 | 4/1991 | Roncato et al. . |
| 5,049,407 | 9/1991 | Soszka et al. . |
| 5,055,119 | 10/1991 | Flautt et al. . |
| 5,171,634 | 12/1992 | Soszka et al. . |
| 5,181,947 | 1/1993 | Mizuno et al. . |
| 5,328,494 | 7/1994 | Kelman et al. . |
| 5,395,574 | 3/1995 | Gonthier et al. . |
| 5,454,846 | 10/1995 | Roncato et al. . |

OTHER PUBLICATIONS

"Heloxy® Epoxy Functional Modifiers," Shell Chemical Company, Apr. 1994.

*Primary Examiner*—Leo B. Tentoni
*Attorney, Agent, or Firm*—C. Michael Gegenheimer; Inger H. Eckert

[57] ABSTRACT

A method and apparatus is provided for the in-line production of composite strand material and the conversion of at least a portion of the strand material into a composite product. The apparatus (10) includes a combining station (48) where glass fibers (14) with a second polymeric material (66) are combined to form composite strand material (16), and at least one mold (54) for receiving a portion of the composite strand material and forming the portion into a composite product. The apparatus also includes transfer equipment for moving the composite strand material from the combining station to the mold, which may include a computer-controlled robotic arm (52). In another embodiment, the apparatus includes a collecting device (18) for accumulating the composite strand material (16) in looped form and equipment for delivering the accumulated portion from the collecting device to the mold (54). In a further embodiment, the apparatus includes a chopping device (72) for chopping portions of the composite strand material prior to placement into the mold (54).

26 Claims, 5 Drawing Sheets

METHOD AND APPARATUS FOR THE IN-LINE PRODUCTION AND CONVERSION OF COMPOSITE STRAND MATERIAL INTO A COMPOSITE PRODUCT

CROSS-REFERENCE TO RELATED APPLICATION

This application is a continuation-in-part of U.S. application Ser. No. 08/540,430, filed Oct. 10, 1995, now abandoned.

FIELD OF INVENTION

The present invention relates to a method and apparatus for producing composite strand material and converting the composite strand material to composite product form during an in-line process.

BACKGROUND OF INVENTION

Glass fibers are commonly manufactured by supplying molten glass to a bushing, drawing glass fibers from the bushing, and applying a size, typically aqueous based, to the fibers. The fibers are then packaged and dried for further processing.

In order to fabricate composite parts, the glass fibers are often coated in an off-line process with a resin. The resin may be thermosetting or thermoplastic. After resin coating, the impregnated glass fibers may be heated under pressure in a mold to form composite parts.

A variety of methods exist for coating glass fibers with resins which include solution processing, slurry processing, and melt impregnation, which involve passing a finished glass fiber tow through a resin-containing liquid. However, while such methods may be effective, they require one or more off-line processing steps which increase the complexity of production and the cost of the final product, and which may degrade the final product strength due to filament damage during additional handling.

An alternative method has been developed for producing composite strands in an in-line process which involves combining glass fibers with organic fibers to form a composite strand. However, while such a process may be performed in-line, it still has the disadvantage of added cost as the composite strands must be packaged or chopped, shipped and unwound before being further processed and fabricated into parts.

Accordingly, there is still a need in the art for a method and apparatus for producing composite strands and converting the composite strands to final product form in an economical manner without the need for additional packaging, shipping and unwinding steps.

SUMMARY OF INVENTION

The present invention meets those needs by providing a method and apparatus for producing composite strand material and converting the composite strand material to a composite product form during an in-line process. By performing the process in-line, the packaging, shipping, and unwinding steps are eliminated, and the final product can be formed in a more efficient and economical manner which preserves mechanical properties.

In accordance with one aspect of the present invention, an in-line apparatus is provided for making a composite strand material and forming at least a portion of the composite strand material into a composite product. The apparatus comprises a heated bushing for supplying streams of molten glass to be drawn into continuous first fibers, a drawing device adapted to draw the streams into first fibers, equipment for supplying a polymeric material to the first fibers, and a combining station where the first fibers with the polymeric material are combined to form composite strand material. The apparatus further includes at least one mold disposed in-line with the combining station for receiving a portion of the composite strand material and forming the portion into a composite product.

Preferably, the equipment for supplying the polymeric material provides second fibers formed from the polymeric material. In a preferred embodiment, the apparatus includes one or more applicators for applying a size to the first and second fibers. The apparatus also preferably includes a drying device for contacting and transferring energy in the form of heat to the first and second sized fibers to dry the size on the fibers before they are gathered into a composite strand material. For example, when an aqueous-based or other solvent-based size is employed, the drying device is used to drive off the solvent from the sizing. It is also contemplated that a drying device may not be required when, for example, the sizing composition is substantially free of a solvent and/or is not heat curable.

The apparatus may include transfer equipment for moving a portion of the composite strand material from the combining station to the mold. In one embodiment of the invention, the transfer equipment comprises a computer-controlled robotic arm which picks up the composite strand material as it exits the combining station and transfers it to the mold. The portion may be cut from the remaining section of the composite strand material via a conventional cutting device provided on the robotic arm or one located below the combining station.

In an alternative embodiment of the invention, the apparatus further comprises a collecting device for accumulating a portion of the composite strand material and equipment for delivering the accumulated portion from the collecting device to the mold. The collecting device preferably comprises a rotating wheel having a plurality of fingers projecting outwardly therefrom for forming axially extending loops in the portion of the composite strand material and a rotatable spinner and iris assembly which receives the axially extending loops and causes the loops to become intertwined with one another. The equipment preferably comprises a computer controlled robotic arm.

The drawing device of the present invention may comprise a pull wheel device. In an alternative embodiment, the drawing device comprises a chopper device for pulling the composite strand material and chopping the material into discrete lengths. When a chopper device is provided, the apparatus preferably further includes a hopper for accumulating the discrete lengths, and equipment for controlling the flow of the discrete lengths of material from the hopper to the mold. The equipment for controlling the flow of the discrete lengths comprises a flow control valve provided on the hopper which is controlled by an automated device. In one embodiment of the invention, the automated device comprises a robotic arm.

In another embodiment of the invention, the apparatus further includes equipment for moving the mold from a first position away from the combining station to a second position adjacent the combining station where it receives the portion of the composite strand material. For example, such equipment may comprise a moving conveyor or belt which transports the mold so that it is aligned directly under the combining station to receive the composite strand material. The portion may be cut from the remaining section of the composite strand material via a conventional cutting device interposed between the combining station and the belt.

In a second aspect of the present invention, an in-line apparatus is provided for making composite strand material and forming portions of the composite strand material into a plurality of composite products. In this embodiment, the apparatus includes a heated bushing, a drawing device, equipment for supplying a second polymeric material, and a combining station for forming a composite strand material as described above, but further includes a plurality of molds disposed in-line with the combining station for receiving portions of the composite strand material and forming each of the portions into a composite product. For example, a plurality of molds may be spaced apart on a moving conveyor and sequentially filled with the composite strand material so that a plurality of composite products may be formed.

The apparatus preferably includes transfer equipment for moving the portions of the composite strand material from the combining station to the molds. In one embodiment, the transfer equipment may comprise a computer controlled robotic arm which picks up individual portions of the composite strand material for placement in each of the molds.

In an alternative embodiment, the apparatus may further comprise a collecting device for accumulating portions of the composite strand material and equipment for delivering the accumulated portions from the collecting device to the molds.

The drawing device may comprise a pull wheel device, or alternatively, the device may comprise a chopper device for pulling portions of the composite strand material and chopping the portions into discrete lengths. When a chopper device is provided, the apparatus preferably further comprises a hopper for accumulating the discrete lengths, and equipment for controlling the flow of the discrete lengths from the hopper to the molds.

In another embodiment of the invention, the apparatus includes equipment for moving the molds from a first position away from the combining station to a second position adjacent the combining station where the molds receive the portions of the composite strand material. For example, a conveyor containing a plurality of molds may be moved to a position directly under the combining station to receive the portions of the composite strand material.

The present invention also provides a process for the in-line production of composite strand material and the conversion of at least a portion of the composite strand material into a composite product. The method comprises the steps of drawing a plurality of first fibers from a source of molten glass, providing a supply of a polymeric material to the first fibers, and combining the first fibers with the polymeric material at a combining station to form a composite strand material. The process further includes the steps of placing a portion of the composite strand material into a forming device, and forming the portion into a composite product. The polymeric material supplied to the glass fibers may be in liquid, powder or fiber form.

The placing step may include the step of moving the portion of the composite strand material from the combining station to the forming device. In an alternative embodiment, the placing step includes the step of moving the mold from a first position away from the combining station to a second position adjacent the combining station where it receives the portion of the composite strand material.

Examples of composite parts which are capable of being formed by the method and apparatus of the present invention include rebars for concrete reinforcement, or a variety of automotive parts. The method and apparatus of the present invention provides several advantages over prior art methods which typically apply a thermoplastic material to glass fibers during an off-line process. Because the present invention combines matrix resin materials with glass fibers during the glass fiber forming operation, many operations, such as winding, drying and unwinding of glass fibers and subsequent polymer coating of the unwound glass fibers, which were previously required to form composite parts, can now be eliminated.

Accordingly, it is a feature of the present invention to provide an in-line method and apparatus for making a composite strand material and forming the composite strand material into a composite product. These and other features and advantages of the present invention will become apparent from the following detailed description, the accompanying drawings, and the appended claims.

PREFERRED EMBODIMENTS OF THE INVENTION

Figure 1:
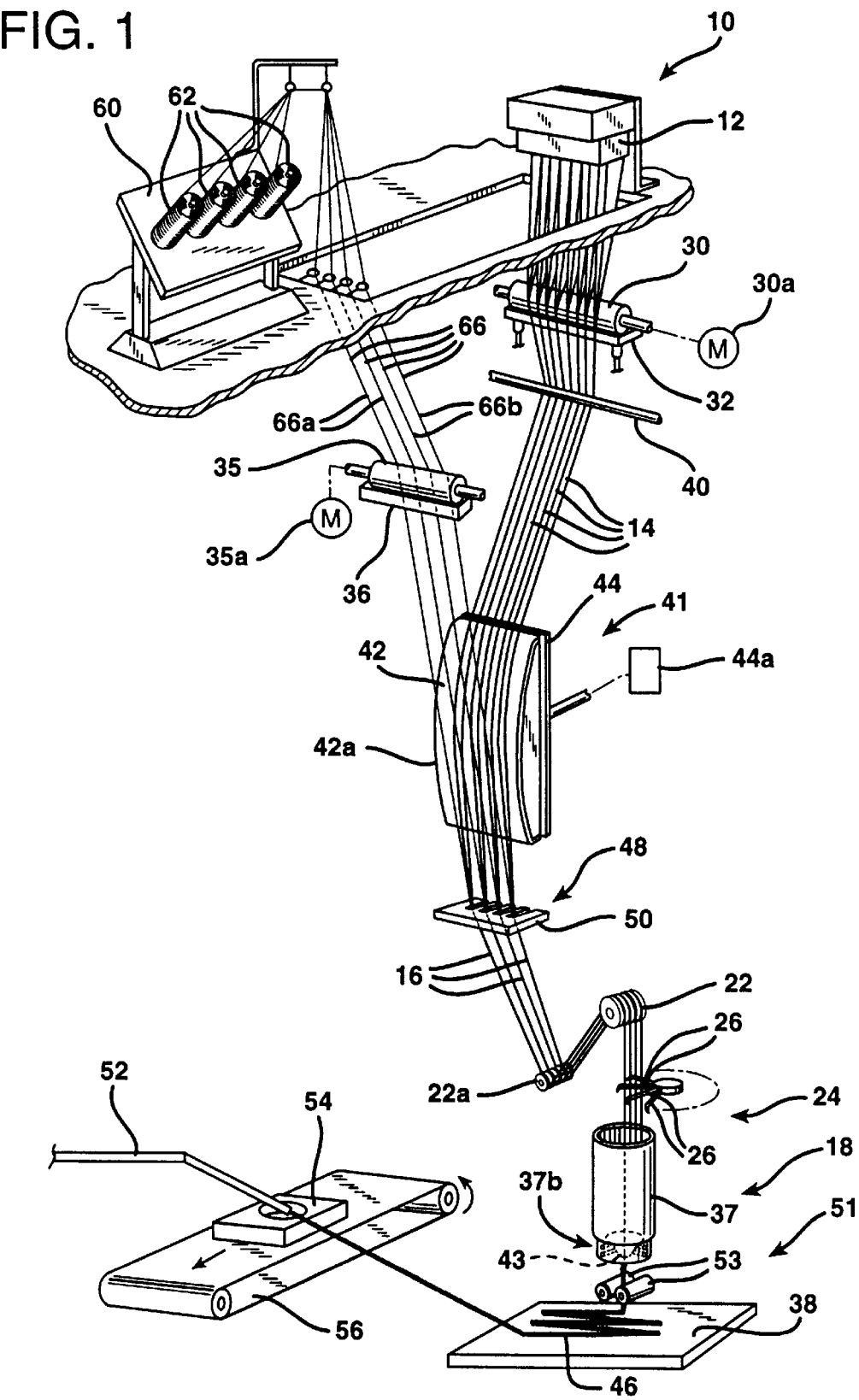
FIG. 1 is a perspective view of one embodiment of the apparatus of the present invention.

FIG. 1 illustrates one embodiment of the apparatus 10 of the present invention, which includes a heated bushing 12 having a number of orifices (not shown) through which a plurality of streams of molten glass are discharged. The streams of glass are mechanically drawn to form first continuous fibers 14 via a drawing device comprising, in the illustrated embodiment, a pull wheel 22.

As shown, the first fibers 14 preferably pass over a first applicator roll 30, which applies a liquid coating of first bonding size composition to the fibers 14. The sizing composition is typically aqueous based, but may be of any other suitable type. Examples of aqueous-based bonding sizes are set out in U.S. patent application Ser. No. 08/311,817, filed Sep. 26, 1994, entitled CONTACT DRYING OF FIBERS TO FORM COMPOSITE STRANDS, now U.S. Pat. No. 5,626,643, the disclosure of which is hereby incorporated by reference in its entirety. Examples of non-aqueous based bonding sizes are set out in U.S. patent application Ser. No. 08/487,948, filed Jun. 7, 1995, entitled METHOD AND APPARATUS FOR THE IN-LINE IMPREGNATION OF FIBERS WITH A NON-AQUEOUS CHEMICAL TREATMENT, abandoned in favor of continuation application, U.S. Ser. No. 08/872,232, filed Jun. 10, 1997, and in contemporaneously filed patent application Ser. No. 08/695,504, entitled CHEMICAL TREATMENTS FOR FIBERS AND WIRE-COATED COMPOSITE STRANDS FOR MOLDING FIBER-REINFORCED THERMOPLASTIC COMPOSITE ARTICLES, having Attorney Docket Number 23805A, the disclosures of which are hereby incorporated by reference in their entirety.

A trough 32 containing the sizing composition is positioned below the roller 30. The roller 30 extends into the trough 32 and, as it is rotated by a conventional drive device 30a (e.g., motor), transfers sizing composition from the trough 32 to the fibers 14. It should be appreciated that other devices or techniques for applying size to the glass fibers 14 may be used in place of the applicator roll 30.

The apparatus further includes equipment for supplying second material to the first fibers 14, which may include a supply rack 60 on which one or more packages 62 containing a supply of second fibers 66 formed of second material are positioned. In the embodiment illustrated in FIG. 1, the second fibers 66 are drawn via the pull wheel 22 and passed over a second applicator roll 35 before being commingled with the first fibers 14.

The second fibers 66 can be chosen from a wide variety of compositions. For some applications, it is preferable that at least a substantial portion, if not all, of the second fibers 66 be polymeric fibers 66a made from a polymeric material which may or may not be preformed (i.e., previously manufactured and collected). Suitable polymeric materials for fibers 66a can be selected from the group which includes nylon, polyester, polyamide, polypropylene, polystyrene and polyphenylene sulfide. It may also be desirable for some of the second fibers 66 to be reinforcing fibers 66b which are preformed and suitable for forming a reinforcing element in a molded composite product. Suitable materials for preformed second reinforcing fibers 66b can be selected from the group which includes S-glass, Kevlar® and graphite. It is also contemplated that any other suitable inorganic or organic fiber not specifically set out herein may also be employed. While only four second fibers 66 are shown in the illustrated embodiments, it is contemplated that less than four or more than four may be employed.

The second applicator roll 35 extends into trough 36 and, as it is rotated by drive device 35a, applies a liquid coating of sizing composition to the second fibers 66 which may be the same as or different from the size composition applied to the first fibers 14. The type of size used may also vary from one type of material to another. Thus, a third applicator roll (not shown) may be provided for applying a third sizing composition to a second portion of the second fibers 66, with the first portion of the second fibers 66 receiving a second sizing composition, which may differ from the first and third compositions, via applicator roll 35.

After passing over the first applicator roll 30, the first fibers 14 pass over and contact a heating device 41, which is substantially similar to the heating device set forth in U.S. application Ser. No. 08/291,801, filed Aug. 17, 1994, entitled "Method and Apparatus for Forming Continuous Glass Fibers," the disclosure of which is hereby incorporated by reference. The heating device 41 is used when an aqueous-based or other solvent-based size is employed to drive off the solvent from the size. It is also contemplated that a drying device may not be required when, for example, the sizing composition is substantially free of a solvent and/or is not heat curable.

An engagement roller or bar 40, formed, for example, from a ceramic material, is provided between the first applicator roll 30 and the heating device 41 to ensure that the first fibers 14 make good contact with both the first applicator roll 30 and the heated device 41.

The heating device 41 comprises a first plate 42 having a curved outer surface 42a which is directly contacted by the fibers 14, preferably along its entire extent. A resistance-heated second plate 44, which is connected to a power supply 44a, is spaced a small distance from the first plate 42 and serves to radiantly heat the first plate 42. As the fibers 14 pass over the first plate 42, energy in the form of heat is transferred from the first plate 42 to the sized fibers 14. When an aqueous-based size is employed, the heat transferred from the first plate 42 to the fibers 14 evaporates water from the size.

Preferably, the second material fibers 66 contact the first plate 42 at a position below the midpoint of the plate 42 such that the fibers 66 engage only about ⅓ of the length of the plate 42, which prevents overheating of the second fibers 66. Obviously, the type of material used for the second fibers will determine the amount of acceptable heat exposure. In this situation, "acceptable heat exposure" means that amount of heat energy that can be applied to the second fibers 66 before their physical characteristics are greatly altered. The polymer fibers 66a would be particularly susceptible to overheating. Other second fibers, such as various non-polymeric fibers, can contact plate 42 along more than ⅓ of its length.

As the second fibers 66 engage the first plate 42, they become commingled with the first fibers 14. After passing over the first plate 42, the first and second fibers 14 and 66 are combined via a splitter 50 at a combining station 48 into a predetermined number of separate composite strands 16, each comprising one second fiber 66 and a plurality of first fibers 14. From the splitter 50, the strands 16 pass over an idler roller 22a and are advanced by the driven pull wheel 22. While in the embodiment shown in FIG. 1 the fibers 14 and 16 are split into four strands 16, it should be appreciated that the fibers may be split into more than four strands or less than four strands. Further, the number of second fibers 66 provided in each strand 16 may vary as well as the material from which the second fibers 66 are formed, as noted previously.

In the embodiment shown in FIG. 1, a collecting device 18 is provided in-line with the combining station 48 for receiving strands 16 and forming those strands into a high bulk glass forming roving product 46 which, as will be discussed more explicitly below, is formed via one or more molds 54 into composite parts. The device 18 may be constructed in the same manner as any one of the devices set forth in U.S. Pat. Nos. 4,776,162, 4,790,136, and 4,802,331, the disclosures of which are incorporated herein by reference.

As can be discerned from FIG. 1, the pull wheel 22 advances the composite strands 16 into the collecting device 18 which includes a rotating finger wheel 24, a generally cylindrical spinner 37 and a static iris assembly 37b. The iris assembly 37b is provided with an outlet orifice 43 whose diameter is substantially less than the inner diameter of the spinner 37. The finger wheel 24 includes a plurality of generally radially and downwardly extending fingers 26 for temporarily engaging and suspending the progress of the split strands 16 to form axially extending loops in the strands (not shown). The axially looped split strands emerge from the tips of the fingers 26 of the finger wheel 24 and pass into the interior of the spinner 37, which is rotated at a relatively high speed. In the spinner 37, the axially looped split strands are caused to adhere to its inside surface by virtue of the centrifugal force imparted to such axially looped split strands by the rotation of the spinner 37. The spinning of the axially looped split strands causes a twist to be imparted to all such strands, and it causes individual split strands to be moved from side to side relative to one another to help provide an inter-engaging or intertwining relationship between such split strands.

As the axially looped split strands pass from the spinner 37, they are caused to slide across an inner surface of the iris assembly 37b prior to passing through the outlet orifice 43. The speed of advance of the axially looped split strands passing from the bottom of the spinner 37 is controlled, in relationship to the number of such loops, by controlling the speed of the driven pull wheel 22 in relationship to the rotational speed of the finger wheel 24 and the number of fingers 26 of the finger wheel, so that the axial length of each of the axially extending loops is greater than the distance between the tips of the fingers 26 and the bottom of the spinner 37.

The relationship between the length of the axially extending loops, as described above, and the length of the rotating spinner 37 causes the axially looped split strands that pass through the spinner 37 to puddle up in a mass in the iris assembly 37b. While the axially looped split strands are in this spinning mass, portions of individual loops are caused to further loop outwardly in a cross-axial direction by virtue of the centrifugal force that such axially looped strands experience in the spinner 37 and the projection velocity of the incoming fibers, especially while the axially looped strands are in the puddled mass in the iris assembly 37b where such axially looped strands are experiencing no appreciable forward axial motion, and these cross-axial loops further inter-engage or intertwine with one another and with other axially extending loops to further help to form an entangled, composite structure in the form of the roving 46 out of all of the axially looped split strands that enter the spinner 37.

The roving 46 exits from the spinner 37 under the influence of a driven pull roll assembly 51, which is made up of counter-rotating pull rolls 53. From the pull roll assembly 51, the roving 46 is laid down onto a plate 38 which is caused to move back and forth via a conventional drive (not shown) so as to allow the roving 46 to accumulate in an oriented fashion. The roving 46 is then moved from the plate 38 by a robotic arm 52, which picks up a portion of the roving 46 and places it into a mold 54 on a movable conveyor 56.

Figure 2:
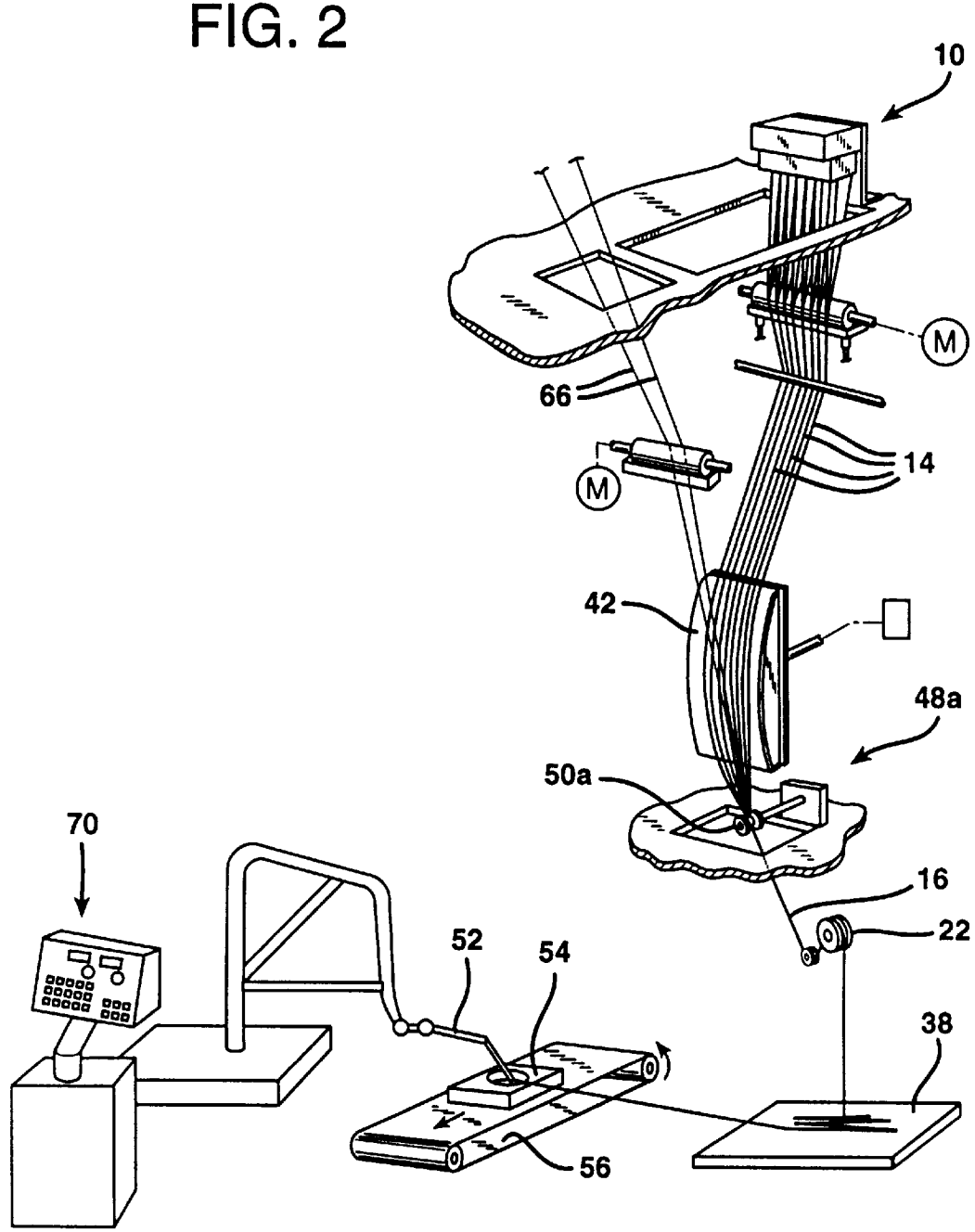
FIG. 2 is a perspective view of an alternative embodiment of the apparatus.

The mold 54 located on conveyor 56 is considered to be disposed in-line with the combining station 48 even though the collecting device 18 is located between it and the combining station 48. The robotic arm 52 is controlled by a computer (such as shown in FIG. 2) so that it orients the roving 46 in the mold 54 in a desired manner. The arm 52 is equipped with pinch rollers (not shown) and a cutting device (not shown) so as to grasp the roving 46 and cut it when the desired portion has been placed in the mold 54. After the mold 54 is filled, the conveyor transports the mold 54 to one or more stations where the portion of roving material is heated and formed into a composite part.

Referring now to FIG. 2, where like reference numerals represent like elements, an alternative embodiment of the present invention is illustrated. In this embodiment, the first and second fibers 14 and 66, after passing over the first plate 42, are combined via a gathering shoe 50a at a combining station 48a into a single composite strand 16a. From the gathering shoe 50a, the strand 16a is advanced by a driven pull wheel 22 directly to the plate 38, which moves back and forth and accumulates the strand 16a in an oriented fashion. A robotic arm 52, controlled via a computer 70, transfers the composite strand material 16a from the plate 38 to the mold 54 on the conveyor 56 as described above. The arm 52 is provided with grouping elements (not shown) and a cutting device (not shown) so as to grasp the strand 16a and cut it when the desired portion of the strand 16a has been placed in the mold 54. It is also contemplated that a cutting device (not shown) may be positioned between pull wheel 22 and plate 38 to cut the strand 16a into appropriate lengths. The computer 70 controls the horizontal and vertical movements of the arm 52 so that placement of the composite strand material 16a in the mold 54 occurs in the desired manner.

Figure 3:
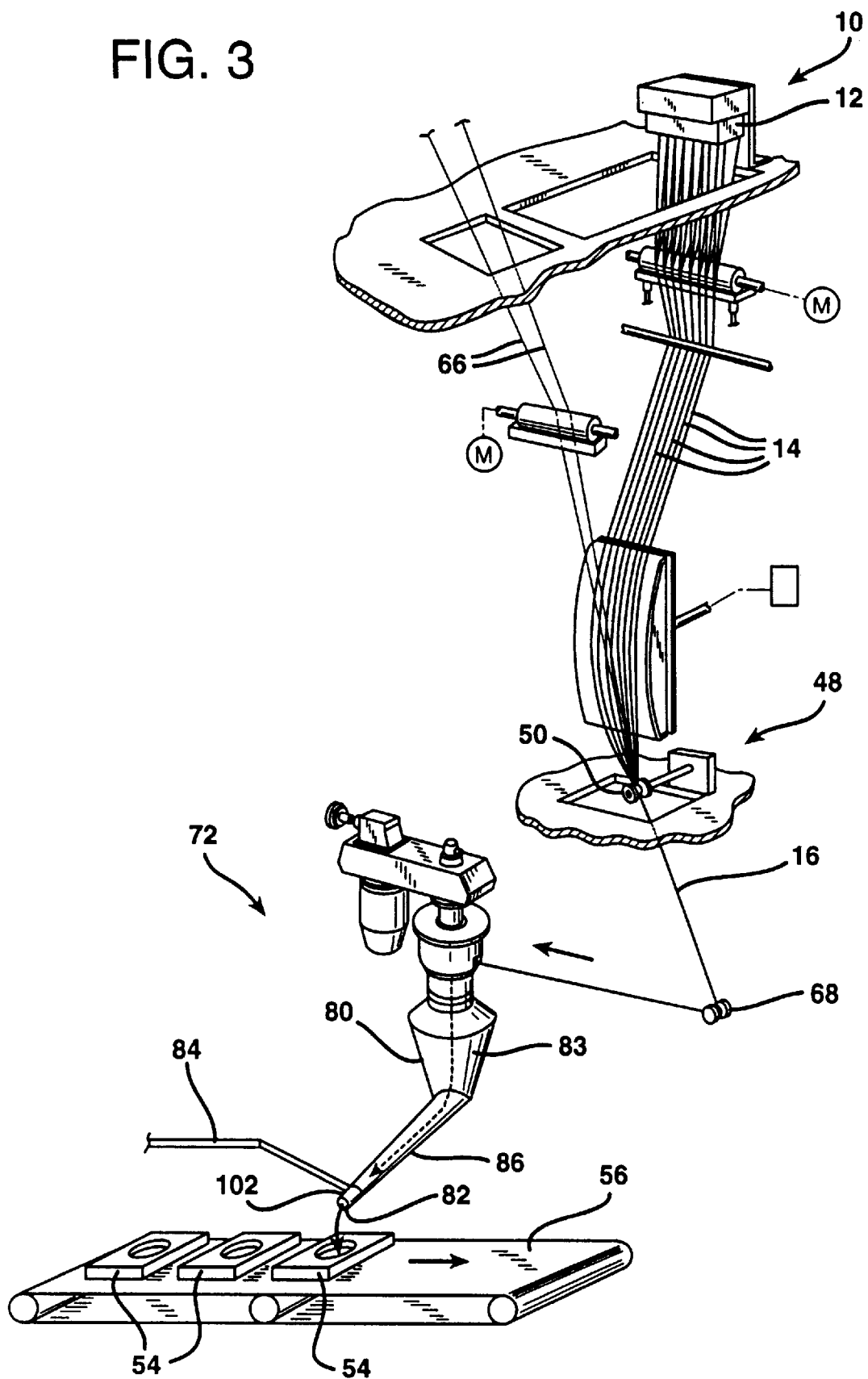
FIG. 3 is a perspective view of another alternative embodiment of the apparatus.
Figure 5:
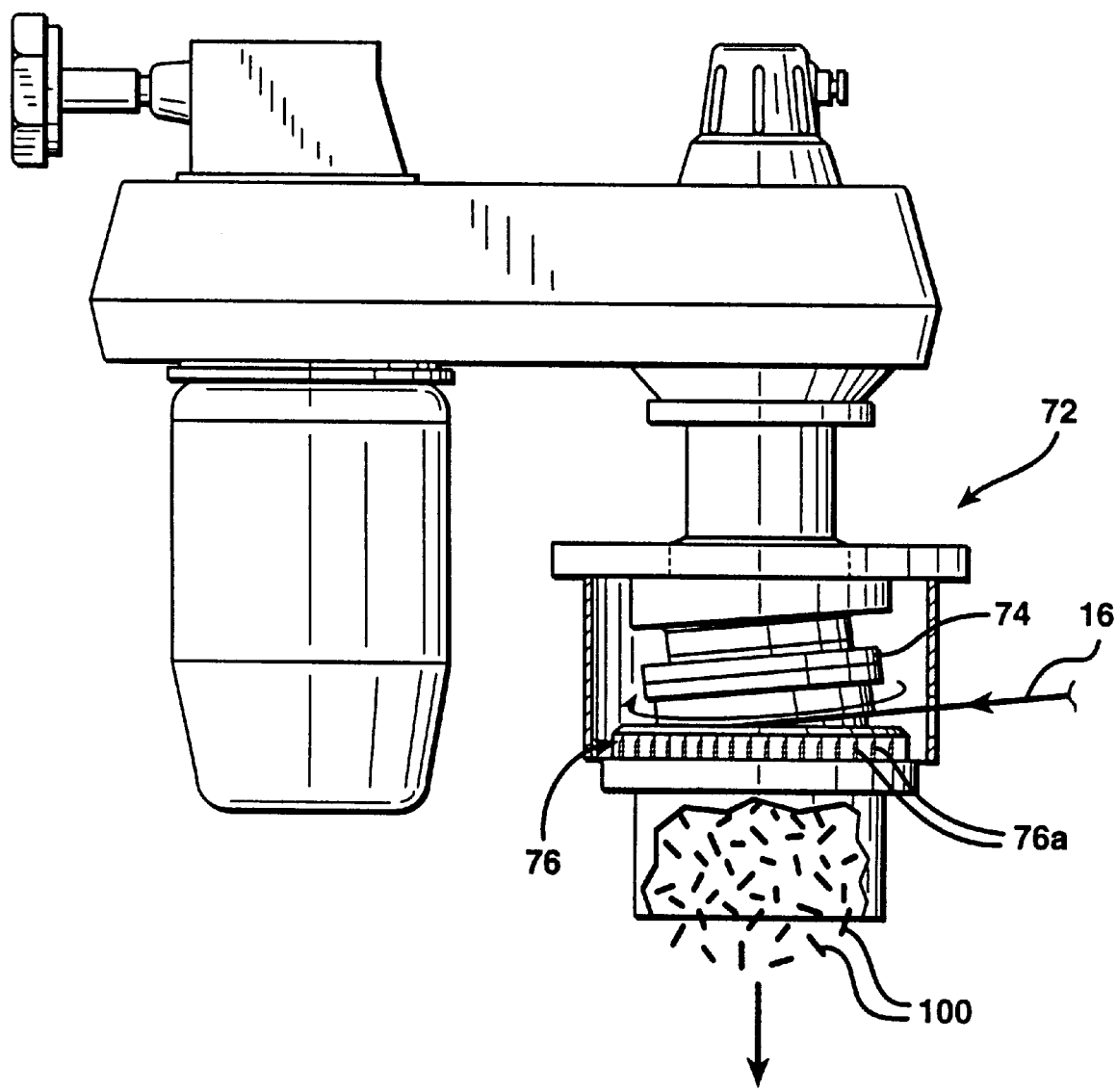
FIG. 5 is an enlarged side view of the chopping device shown in FIG. 3.

FIG. 3 illustrates yet another embodiment of the apparatus of the present invention in which a conventional chopper device 72 is provided for drawing first fibers 14 from streams of glass provided by bushing 12, pulling second fibers 66 from packages such as shown in FIG. 1, and chopping a composite strand material 16a formed from the first and second fibers 14 and 66 into discrete lengths 100 (see FIG. 5). This embodiment is preferred where discrete lengths of glass fibers in the final composite part are desired.

In this embodiment, the first and second fibers 14 and 66 are combined at the combining station 48 via the gathering shoe 50a to form the composite strand 16a. From the gathering shoe 50a, the strand 16a passes a guiding shoe 68 before entering into the chopper device 72.

As shown in FIG. 5, the chopper device 72 comprises an anvil 74 which rotates at an axis at an angle to vertical and a rotating cutting element 76 having a plurality of circumferentially positioned, vertically aligned blades 76a. As the anvil 74 and cutting element 76 rotate, they pull the strand 16a into the device 72 and cut it into discrete lengths. Such a device is commercially available from Neumag under the tradename NMC.

The chopped composite strand material 100 is accumulated in a hopper 80, as shown in FIG. 3, which includes a main body portion 83 having an entrance opening and an elongated flexible trunk 86 having an exit opening 82. As shown, in this embodiment, the apparatus includes a plurality of molds 54 on a conveyor 56 which are moved directly under the hopper 80 for sequentially receiving a predetermined amount of the chopped composite strand material 100. The trunk 86 further includes a conventional valve 102 which controls the flow of chopped composite material 100 from the hopper 80. A robotic arm 84 or other automated device controls the operation of the valve 102 as well as the orientation of the trunk 86 so that an appropriate amount of the chopped strand material 100 is delivered into the molds 54 in the desired manner.

Figure 4:
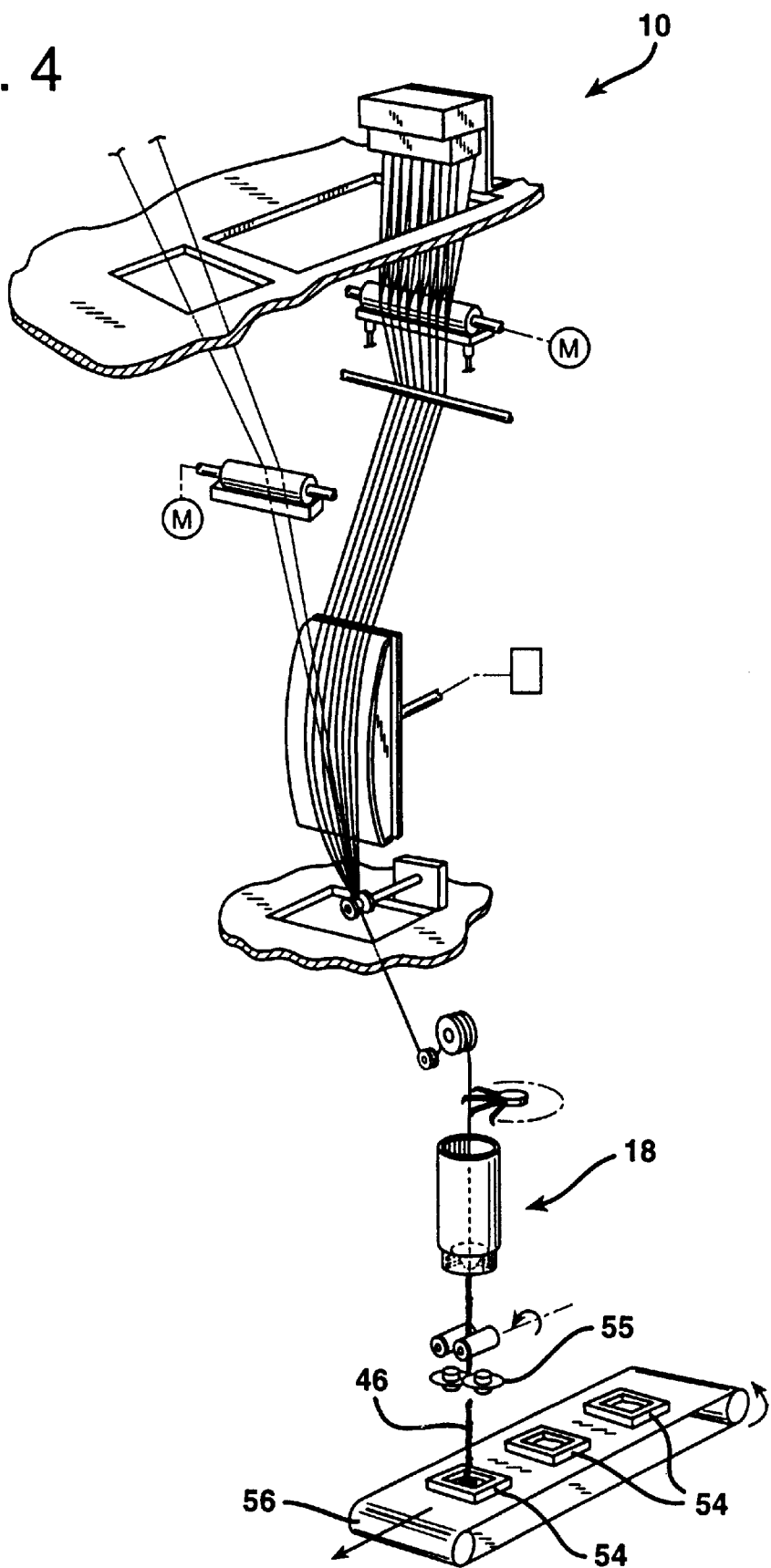
FIG. 4 is a perspective view of still another alternative embodiment of the apparatus.

Referring now to FIG. 4, a further embodiment of the apparatus of the present invention is illustrated. This embodiment is similar to the one illustrated in FIG. 2 except that cut portions of the roving 46 pass directly from the collecting device 18 into one of a series of molds 54. As shown, the molds 54 are preferably placed on a conveyor or belt 56 and moved to a position directly under the collecting device 18 so as to receive a portion of the roving 46 in a desired manner. A conventional cutting device 55 is provided for cutting the roving 46 into discrete portions. Alternatively, a robotic arm (not shown) may be present adjacent to the collecting device 18 to direct portions of the roving 46 into the molds 54 so that placement of the roving portions within the molds 54 occurs in a desired fashion. Alternate collecting devices such as a rotating drum may also be used.

After the molds 54 are filled, they are transported to one or more molding stations where the roving portions are heated, consolidated, and cooled to form composite parts. Typical composite parts formed in accordance with the present invention include rebars for concrete reinforcement having a glass content of from about 30–85% by weight. It is also contemplated that composite parts may be formed which are intended to be reformed in a subsequent operation. Such parts include automotive parts such as dashboards, bumper beams, and seat backs.

While certain representative and preferred embodiments and details have been shown for purposes of illustrating the invention, it will be apparent to those skilled in the art that various changes in the methods and apparatus disclosed herein may be made without departing from the scope of the invention, which is defined in the appended claims and their equivalents.

We claim:

1. An in-line apparatus for making a composite strand material and forming at least a portion of said composite strand material into a composite product comprising:
   a bushing for supplying streams of molten glass to be drawn into continuous first fibers;
   a drawing device adapted to draw said streams into said first fibers;
   equipment for supplying a polymeric material to said first fibers;
   a combining station where said first fibers with said polymeric material are combined to form composite strand material, and
   at least one mold disposed in-line with said bushing and said combining station for receiving a portion of said composite strand material and forming said portion into a composite product.

2. An in-line apparatus as set forth in claim 1, further comprising transfer equipment for moving said portion of said composite strand material from said combining station to said mold.

3. An in-line apparatus as set forth in claim 2, wherein said transfer equipment comprises a computer controlled robotic arm.

4. An in-line apparatus as set forth in claim 1, further comprising a collecting device for accumulating said portion of said composite strand material and equipment for delivering said accumulated portion from said collecting device to said mold.

5. An in-line apparatus as set forth in claim 4, wherein said collecting device comprises a rotatable wheel having a plurality of fingers projecting outwardly therefrom for forming axially extending loops in said portion of said composite strand material and a rotatable spinner and iris assembly which receive said axially extending loops and cause said loops to become intertwined with one another.

6. An in-line apparatus as set forth in claim 4, wherein said equipment for delivering comprises a computer controlled robotic arm.

7. An in-line apparatus as set forth in claim 1, wherein said drawing device comprises a pull wheel.

8. An in-line apparatus as set forth in claim 1, wherein said drawing device comprises a device for pulling said portion of composite strand material and chopping said portion into discrete lengths.

9. An in-line apparatus as set forth in claim 8, further comprising a hopper for accumulating said discrete lengths, and equipment for controlling the flow of said discrete lengths from said hopper to said mold.

10. An in-line apparatus as set forth in claim 9, wherein said equipment for controlling the flow of said discrete lengths comprises a flow control valve controlled by an automated device.

11. An in-line apparatus as set forth in claim 1, further comprising equipment for moving said mold from a first position away from said combining station to a second position adjacent said combining station where it receives said portion of said composite strand material.

12. An in-line apparatus as set forth in claim 1, wherein said supply equipment includes equipment for providing second fibers formed from said polymeric material.

13. An in-line apparatus as set forth in claim 12, further comprising one or more applicators for applying a size to said first and second fibers.

14. An in-line apparatus as set forth in claim 13, further comprising a drying device for contacting and transferring energy in the form of heat to said first and second sized fibers to dry the size on said first and second fibers before they are gathered into said composite strand material.

15. An in-line apparatus for the in-line production of composite strand material and the conversion of portions of said composite strand material into composite products comprising:
   a heated bushing for supplying streams of molten glass to be drawn into continuous first fibers;
   a drawing device adapted to draw said streams into said first fibers;
   equipment for supplying a polymeric material to said first fibers;
   a combining station where said first fibers with said polymeric material are combined to form composite strand material; and
   a plurality of molds disposed in-line with said bushing and said combining station for receiving portions of said composite strand material and forming each of said portions into a composite product.

16. An in-line apparatus as set forth in claim 15, further comprising transfer equipment for moving said portions of said composite strand material from said combining station to said molds.

17. An in-line apparatus as set forth in claim 15, wherein said transfer equipment comprises a computer controlled robotic arm.

18. An in-line apparatus as set forth in claim 16, further comprising a collecting device for accumulating said portions of said composite strand material and equipment for delivering said accumulated portions from said collecting device to said molds.

19. An in-line apparatus as set forth in claim 15, wherein said drawing device comprises a pull wheel device.

20. An in-line apparatus as set forth in claim 15, wherein said drawing device comprises a device for pulling said portions of said composite strand material and chopping said portions into discrete lengths.

21. An in-line apparatus as set forth in claim 20, further comprising a hopper for accumulating said discrete lengths, and equipment for controlling the flow of said discrete lengths from said hopper to said molds.

22. An in-line apparatus as set forth in claim 15, further comprising equipment for moving said molds from a first position away from said combining station to a second position adjacent said combining station where said molds receive said portions of said composite strand material.

23. A method for the in-line production of composite strand material and the conversion of at least a portion of said composite strand material into a composite product comprising the steps of:
   a) drawing a plurality of first fibers from a source of molten glass;

b) supplying a polymeric material to said first fibers;

c) combining said first fibers with said polymeric material at a combining station to form a composite strand material;

d) placing a portion of said composite strand material into a molding device which is disposed in-line with said source of molten glass; and e) molding said portion into a composite product.

24. The method set forth in claim 23, wherein said forming device comprises a mold.

25. The method set forth in claim 24, wherein said placing step includes the step of moving said portion of said composite strand material from said combining station to said mold.

26. The method set forth in claim 24, wherein said placing step includes the step of moving said mold from a first position away from said combining station to a second position adjacent to said combining station where it receives said portion of said composite strand material.

* * * * *